(12) United States Patent
Wasso, Jr.

(10) Patent No.: US 10,364,071 B1
(45) Date of Patent: Jul. 30, 2019

(54) REUSABLE MAGNETIC BOTTLE CLOSURES, METHODS, AND SYSTEMS

(71) Applicant: Fred Patrick Wasso, Jr., Manteno, IL (US)

(72) Inventor: Fred Patrick Wasso, Jr., Manteno, IL (US)

( * ) Notice: Subject to any disclaimer, the term of this patent is extended or adjusted under 35 U.S.C. 154(b) by 0 days.

(21) Appl. No.: 16/030,667

(22) Filed: Jul. 9, 2018

Related U.S. Application Data

(63) Continuation of application No. 15/877,383, filed on Jan. 22, 2018.

(51) Int. Cl.
| | |
|---|---|
| *B65D 41/04* | (2006.01) |
| *B65D 1/02* | (2006.01) |
| *B65D 39/00* | (2006.01) |
| *B65D 51/24* | (2006.01) |
| *B65D 41/17* | (2006.01) |

(52) U.S. Cl.
CPC ....... *B65D 41/0485* (2013.01); *B65D 1/0207* (2013.01); *B65D 39/0023* (2013.01); *B65D 41/17* (2013.01); *B65D 51/249* (2013.01); *B65D 2313/04* (2013.01)

(58) Field of Classification Search
CPC ............ B65D 43/0214; B65D 39/0023; B65D 39/0005; B65D 39/00; B65D 39/08; B65D 1/0207; B65D 41/0485; B65D 41/0478; B65D 41/0471; B65D 41/17; B65D 51/249; B65D 51/24; B65D 51/245; B65D 51/28
USPC ....... 220/230, 803, 802, 801, 796, 483, 212, 220/287; 215/364, 355, 230, 227, 356, 215/228
See application file for complete search history.

(56) References Cited

U.S. PATENT DOCUMENTS

| | | | | |
|---|---|---|---|---|
| 1,999,358 A | * | 4/1935 | Hoeter | B65D 49/06 192/129 R |
| 2,893,585 A | * | 7/1959 | Hoef | B65D 41/185 206/818 |
| 3,991,896 A | * | 11/1976 | Miranda | B01L 3/50825 215/227 |

(Continued)

FOREIGN PATENT DOCUMENTS

| | | | | |
|---|---|---|---|---|
| DE | 4234558 A1 | * | 4/1994 | ....... B01L 3/50825 |
| FR | 2893312 A1 | * | 5/2007 | ........ A47G 7/044 |

OTHER PUBLICATIONS

Translation of DE4234558, Leinert, Apr. 21, 1994, Figure (Year: 1994).*

(Continued)

*Primary Examiner* — Robert J Hicks
(74) *Attorney, Agent, or Firm* — Cygan Law Offices P.C.; Jeffrey S. Dixon

(57) ABSTRACT

Drinking bottle closures include a sealing portion, an upper side that may bear indicia, and a retained magnet. The magnet may be retained in a cavity of the closure separated from the sealing portion by a seamless barrier. The sealing portion may include a frictionally retained male tapered plug or a radially compressible, gripping female cap liner to fit one or multiple bottle opening sizes. In a method of use, the cap may be retained on a magnetically attracted surface until used to close and identify a drinking bottle. The magnetically attracted surface may be a plate connected to a mount for connecting the magnetic surface to a non-magnetic surface.

11 Claims, 6 Drawing Sheets

(56) References Cited

U.S. PATENT DOCUMENTS

| | | | | |
|---|---|---|---|---|
| 4,223,799 | A * | 9/1980 | Eyster | B60K 15/0406 215/201 |
| 4,957,266 | A * | 9/1990 | Ellis | B60K 15/0406 220/230 |
| 5,638,972 | A | 6/1997 | Druitt | |
| 5,957,313 | A * | 9/1999 | Bouan | B65D 45/32 215/215 |
| 6,382,450 | B1 * | 5/2002 | De Rosa | B65D 41/02 206/818 |
| 6,390,319 | B1 * | 5/2002 | Yu | B65D 81/24 215/6 |
| 8,251,221 | B1 * | 8/2012 | Castaneda | B65D 81/02 206/446 |
| 8,556,095 | B1 | 10/2013 | Yamaguchi | |
| 8,613,369 | B2 * | 12/2013 | Kitto | B65D 55/16 220/379 |
| 9,345,293 | B1 | 5/2016 | Yamaguchi | |
| 2007/0170184 | A1 * | 7/2007 | Canedo | A45F 3/18 220/254.9 |
| 2008/0272085 | A1 * | 11/2008 | Laporta | B65D 39/0052 215/296 |
| 2014/0001184 | A1 | 1/2014 | Heiml | |
| 2014/0263319 | A1 * | 9/2014 | Fazi | B65D 77/0486 220/230 |
| 2015/0253055 | A1 | 9/2015 | Tsui | |

OTHER PUBLICATIONS

Translation of FR2893312, Surriray, May 18, 2007, pp. 4-5 (Year: 2007).*

Stephen Kitto, "Magnetic Top Water Bottle: Never Lose Your Lid!" (Kickstarter), available at: https://www.kickstarter.com/projects/1857082487/magnetic-top-water-bottle-never-lose-your-lid (last visited Jul. 25, 2016).

* cited by examiner

US 10,364,071 B1

REUSABLE MAGNETIC BOTTLE CLOSURES, METHODS, AND SYSTEMS

CROSS-REFERENCE TO RELATED APPLICATIONS

The present application is a Continuation of, and claims priority to, co-pending U.S. patent application Ser. No. 15/877,383, filed Jan. 22, 2018, entitled "REUSABLE MAGNETIC BOTTLE CLOSURES, METHODS, AND SYSTEMS," which is by the same inventor and assigned to the same assignee as the present application, and which is hereby incorporated by reference herein in its entirety.

FIELD OF THE INVENTION

The present invention relates to bottle closures, and more particularly reusable bottle closures, bottle closures that are magnetically attachable to a storage surface, and bottle closures fitting multiple bottle sizes.

BACKGROUND

Frequently, several people at the same social gathering or work site drink water or another beverage from similar or identical disposable bottles. This often leads to confusion as to which bottle is whose, which in turn often leads to needless germ transfer, when one person mistakenly drinks from another's bottle, or needless waste, when one or more bottles are discarded instead of being reused, or before their contents are consumed even once, to avoid such germ transfer.

A need therefore exists for a storable and portable bottle marker, to facilitate and encourage the reuse of disposable drink bottles, and particularly disposable plastic water bottles used for common brands of bottled water.

SUMMARY OF THE INVENTION

Reusable drinking bottle closures, and methods and systems for storing and using the same, are provided. The drinking bottle closures include a sealing portion, an upper side that may bear indicia, and a magnet retained in fixed relation to the sealing portion and the upper side. The magnet may be retained in a cavity of the closure separated from the sealing portion by a seamless barrier, such as a unitary body comprised at least partially in the sealing portion. The sealing portion may fit one or multiple bottle opening sizes. Multiple opening sizes may be accommodated by a frictionally retained tapered plug feature for sealing insertion into a bottle opening, or an end sealing feature operating in conjunction with a separate retention feature, such as a radially compressible cap liner configured to grip bottle threads in an interference fit. The end sealing feature may be a downward-facing compressible ring or disc on a lower side of the closure. In a method of use, the cap may be retained on a magnetically attracted surface until used to close and identify a drinking bottle. The magnetically attracted surface may be part of an existing wall, fixture, or movable article, or it may be a component of a closure storage system according to the invention, such as a plate connected to a mount for connecting the magnetic surface to a non-magnetic surface, such as a pushpin, suction cup, hook-and-loop fastener patch, snap, button, fabric with a button-hole, adhesive, or hole in the surface itself.

In accordance with an aspect of the present invention, a reusable magnetic drinking bottle closure is provided. The bottle closure comprises a sealing portion; an upper side configured to bear identifying indicia, a lower end, and a magnet retained vertically proximate to the lower end. A sealing portion of a closure may comprise, in some embodiments, a male plug with an exterior sealing feature, such as a sealing surface that tapers outward toward an upper end of the plug, for sealingly engaging an approximately straight vertical cylindrical wall of a bottle interior adjacent a bottle rim. In other embodiments, a sealing portion comprises an interior skirt feature of the closure, such as interior threads corresponding to exterior threads of a particular bottle type, or an interior compressible ring configured to engage exterior bottle threads of a range of bottle types. The interior threads or interior compressible ring of the closure typically do not perform a primary sealing function but rather a retaining function, by holding down a sealing seat against the upper end of a bottle rim, where the absence of threads permits uniform flush sealing contact. The sealing seat, which performs the primary sealing function, is typically a downward facing ring or disc of resilient material.

An "upper side" is to be understood as a side of the bottle closure that faces upward when the closure engages and seals an upright drinking bottle. "Indicia" will be understood to include text, markings, symbols, or other images capable of visually distinguishing the bottle closure from another bottle closure that is similar or identical but for bearing different indicia or no indicia. Indicia may be printed, engraved, raised/embossed, or otherwise affixed to the upper side of the bottle closure, such as by being printed on a substrate that is affixed to the upper side. Indicia may include text, photographic images, designs, 3-D ornaments, or other visual subject matter. The indicia may provide a desired visual aesthetic and/or advertise a commercial product, service, or business, while at the same time enabling the owner of the closure to identify a drinking bottle to which it is applied as his or her own. This in turn serves to reduce the spread of pathogens through unintentional sharing of drinking bottles as well as the unnecessary discarding of drinking bottles, as is particularly common with bottles of commercial bottled water.

A "lower end" is to be understood as a lowest part of the bottle closure; that is, a part of the bottle closure that is configured to meet a storage or mounting surface to which the bottle closure is mounted with the upper side generally facing away from the mounting surface. The lower end may, for example, comprise a continuous flat surface or a plurality of bumps, feet, or ridges arranged to support the bottle closure against a flat mounting surface.

By "proximate to a lower end", it is to be understood that at least part of the magnet is close enough to a lower end of the bottle closure to retain the bottle closure to a magnetically attracted mounting surface (e.g., a ferromagnetic surface or another magnet) aligned with the lower end, so that the upper side faces outwardly from the mounting surface.

In an embodiment, the lower end of the bottle closure is disposed below the sealing portion.

In another embodiment, the magnet is configured to be disposed radially outwardly of an opening of a drinking bottle when the drinking bottle closure sealingly engages the drinking bottle opening.

In another embodiment, the sealing portion comprises a tapered plug configured to be sealingly inserted into an opening of a drinking bottle. At least a portion of the plug is tapered outwardly in an upward direction, so that its sealing engagement with the bottle opening tightens as it is pressed downward into the opening. Optionally, the tapered plug comprises a stepped profile, such as one or more horizontal annular surfaces joining a narrow end of a larger conical surface to a wide end of a smaller conical surface, the smaller the wide end of the smaller conical surface being narrower than the narrow end of the larger conical surface, and the two conical surfaces being axially aligned. This permits bottle openings of different diameters to be sealed by the different conical surfaces, while reducing the axial length of the sealing portion that would be required to achieve the same result with a single conical surface having a uniform taper along its entire length.

In another embodiment, the sealing portion comprises a ring of resilient material configured to sealingly conform to exterior threads of a drinking bottle.

In another embodiment, the sealing portion comprises interior threads configured to engage exterior threads of a drinking bottle. In addition, the sealing portion may comprise a downward-facing rim sealing seat configured to sealingly engage an upper rim of the drinking bottle around the drinking bottle opening.

In another embodiment, the bottle closure comprises an annular flange configured to be disposed radially outwardly of an opening of a drinking bottle when the drinking bottle closure sealingly engages the drinking bottle opening, the annular flange comprising a cavity retaining the magnet.

In another aspect of a drinking bottle closure according to the invention, the closure comprises a unitary closure body including a sealing portion and an upper side configured to bear identifying indicia; and a magnet retained within the unitary closure body. The closure is configured so that, when the closure is used to seal a bottle, the magnet is separated from an interior volume of the bottle at least by a unitary, water-impermeable surface of the sealing portion. "Unitary, water impermeable surface" will be understood to mean a seamless surface of a wall or membrane formed of a single piece of water-impermeable material.

In another aspect of the invention, a method of using the reusable magnetic bottle closure to identify a personal drinking bottle is provided. The method includes sealingly engaging the drinking bottle closure to an opening of the personal drinking bottle and, typically, further includes affixing indicia to the upper side of the drinking bottle closure and/or storing the closure on a magnetically attracted surface and removing the closure from the storage surface before using it to seal a bottle. Sealingly engaging the drinking bottle closure to the opening of the personal drinking bottle may comprise positioning the drinking bottle closure above the drinking bottle opening and pressing the drinking bottle closure downwardly.

In another aspect of the invention, a method of making a drinking bottle closure comprises forming a closure body comprising a sealing portion, an upper side configured to bear identifying indicia, and a magnet cavity; and affixing a magnet in the magnet cavity. The closure body may be a unitary, injection molded, plastic body, and the magnet may be affixed in the magnet cavity by over-molding, a press fit, or other suitable method.

In another aspect of the invention, a reusable drinking bottle closure storage system is provided. The storage system comprises one or more reusable magnetic drinking bottle closures and a magnetically attracted storage surface (e.g., a surface of a ferromagnetic body or a magnet) configured to retain the drinking bottle closure against the storage surface. For example, the combination of a magnetic force drawing the magnetically attracted component toward the storage surface and friction between the bottle closure and storage surface may prevent the closure from sliding or losing contact with the storage surface when the storage surface is approximately vertical, and/or the magnetic force alone may prevent the closure from losing contact with the storage surface when the storage surface faces down. A storage surface mount (e.g., suction cup, pushpin, hook-and-loop patch, button, fabric with a button hole, snap, hook, hole in the storage surface itself for receiving a rod or hook, or adhesive patch), connected to the magnetically attracted storage surface is configured to mount the storage surface and retained closure to a non-magnetically attracted storage system support.

BRIEF DESCRIPTION OF THE DRAWINGS

FIG. 1b is a cross-sectional side elevation view of the closure shown in FIG. 1a.

FIG. 4b is a cross-sectional side elevation view of the closure shown in FIG. 4a.

FIG. 5b is an enlarged truncated view of a plug portion of the closure shown in FIG. 5a.

DETAILED DESCRIPTION OF THE INVENTION

Described in this section and illustrated in the accompanying drawings are reusable magnetic personal bottle closures embodying aspects of the invention, including several male plug embodiments and several female plug or internal thread embodiments. Also described are methods according to the invention of storing and using a reusable magnetic container closure to identify the owner of a personal container. While closures of the invention may be advantageously applied to a variety of types of personal containers, the illustrated embodiments are adapted for use in reclosing a disposable individual serving size beverage bottle having its original cap removed, which may, for example, be a bottle used to package and sell Evian®, Ice Mountain®, Aquafina®, Dasani®, Nestle® Pure Life®, Poland Spring®, Smartwater®, Fiji®, or other common brand of bottled water. In addition, materials and methods of manufacturing a reusable magnetic bottle closure are described.

Male Plug Embodiments

Illustrated in FIGS. 1a-6 are several embodiments of male-plug type reusable magnetic personal bottle caps according to the invention. In each of these embodiments, a sealing portion comprises a male plug configured to sealingly insert into a circular opening of a typical disposable plastic water bottle, thus defining a radially outward facing annular region of sealing engagement on the male plug.

Figure 1A:
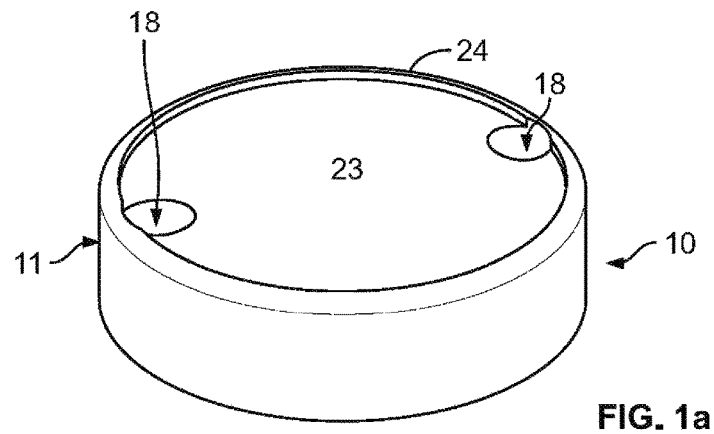
FIG. 1a is a perspective view of a male-plug type reusable magnetic personal bottle closure according to the invention.
Figure 1B:
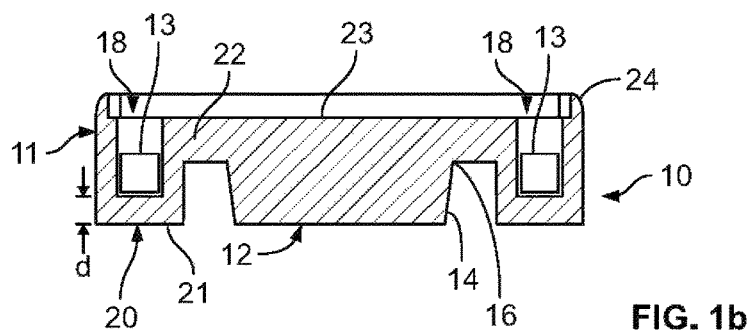

Turning to FIGS. 1a and 1b, an embodiment of a male-plug type reusable magnetic personal bottle closure is illustrated as a cap 10. Cap 10 is formed as a unitary hard cap body 11 retaining magnets 13. A plug 12 serves as a sealing portion of cap 10, plug 12 including a sealing surface 14 that tapers outwardly toward a widest cross section at an upper end 16 thereof. The taper profile of sealing surface 14 is illustrated as a straight line, corresponding to an inverted conical shape of sealing surface 14. Thus, a radially outward sealing pressure on a generally straight, vertical, circular-cylindrical inner wall of a beverage bottle, as is typical for a disposable water bottle. In certain embodiments observed by the inventor to be effective at sealing water in a full, commercially branded disposable water bottle, the effective taper may be so slight as to be practically undetectable visually. However, the slope of the taper is exaggerated for emphasis in the side elevation view shown in FIG. 1b.

Cap body 11 includes peripheral magnet cavities 18 formed in an annular skirt 20 thereof. Skirt 20 generally concentrically encircles plug 12 and is joined thereto by a disc-shaped top portion 22. Magnets 13 may, for example, be held in place in cavities 18 by an adhesive or an interference/press fit. Optionally, a suitable cover or plug (not shown) may close the top openings of each cavity 18, to help retain magnets 13 therein. Preferably, such a plug or cover would seal water out of cavities 18, for ease of cleaning. To serve the same ends, the material of a cap body may alternatively be molded around a magnet, or otherwise formed so as to encase the magnet entirely, as described and illustrated for embodiments discussed below with reference to FIGS. 3 and 10. Magnets 13 are illustrated as small discs which fit in cylindrical magnet cavities 18 having a diameter fitting within the radial width of skirt 20. Alternatively, though not shown, an annular recess having a radial width fitting within the radial width of skirt 20 could be formed to fit a ring shaped magnet having the same cross section perpendicular to an axis of the cap body, for example.

Magnets 13 are disposed at a position in cavities 18 at a small enough distance d from a bottom surface 21 of skirt 20 to permit cap 10 to be magnetically retained against a vertical ferromagnetic surface, such as the side of a refrigerator or steel cabinet, without sliding downward. Thus, according to a method of storing and using cap 10 to reclose and identify a disposable water bottle, a user may store cap 10 on the vertical ferromagnetic surface, retrieve cap 10 after removing an original cap from the disposable water bottle, and press plug 12 of cap 10 downwardly into the opening of the water bottle to seal the opening.

A generally round upper display surface 23 of top portion 22 may be recessed relative to a raised peripheral ridge 24, to guide the placement of a round sticker or other identifier on display surface 23. Alternatively, identifying text or images may be printed or engraved directly onto display surface 23. In still another variation, a three-dimensional ornament, figure, or form may be formed on or attached to display surface 23.

Figure 1C:
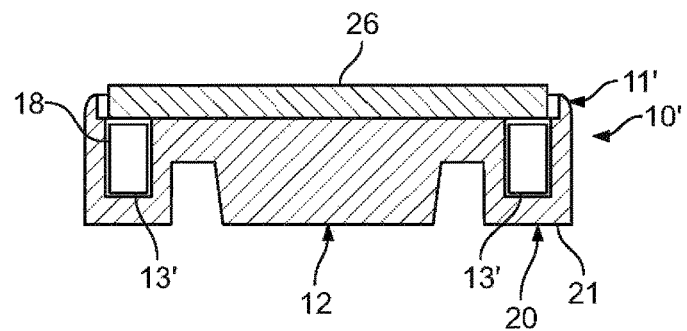
FIG. 1c is a cross-sectional side elevation view of a variation of the closure shown in FIG. 1a including a magnetically attached display disc.

In another embodiment of a male-plug type reusable magnetic personal bottle closure, a cap 10' shown in FIG. 1c comprises the same unitary hard cap body 11 as cap 10, but retains tall cylindrical magnets 13', whose taller height extends from near bottom surface 21 of skirt 20 to near display surface 23, permitting magnets 13' to perform dual functions of magnetically retaining cap 10' to a vertical ferromagnetic storage surface and retaining a ferromagnetic display disc 26 against display surface 23. Cap 10' may thus be provided with a set of interchangeable ferromagnetic display discs 26, and/or replacement display discs 26 may be provided separately, thus permitting a user to alternately customize the appearance of cap 10' with a selected disc 26, which may be provided with different colors, designs, advertisements, slogans, or other indicia. In a variation on cap 10', magnets of comparable vertical dimension to magnets 13 may be positioned both at the bottom and near the top of each cavity 18 or other corresponding recess of a corresponding cap body, with an appropriate spacer disposed between them. In still another variation, the upper and lower magnets may be separately molded or otherwise fully encased in the material of a corresponding cap body.

Figure 2:
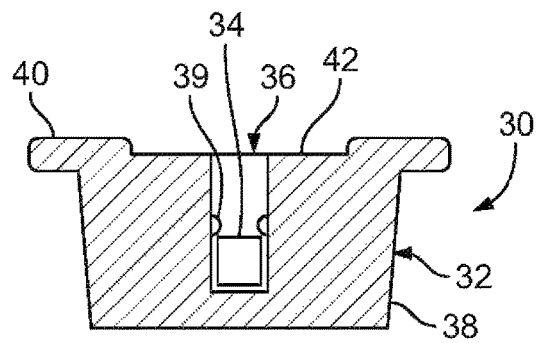
FIG. 2 is a cross-sectional side elevation view of another male-plug type reusable magnetic personal bottle closure according to the invention.

Turning to FIG. 2, another embodiment of a male-plug type reusable magnetic personal bottle closure is illustrated as a cap 30, depicted in cross-sectional side elevation view. As with other embodiments illustrated herein only in cross-sectional side elevation views, the shape of cap 30 shall be understood to be generally axisymmetric. A hard cap body 32 of cap 30 lacks a skirt, instead retaining a magnet 34 in a magnet cavity 36 near the center of a tapered plug 38, which comprises the majority of hard cap body 32. Detent projections 39 may help retain magnet 34 in cavity 36. An upper annular flange 40 is configured to extend radially outwardly beyond the upper rim and screw threads of a water bottle type or types for which cap 30 is adapted, to facilitate removing cap 30 from a reclosed bottle by pushing up on an underside of flange 40. Flange 40 also defines a raised ridge surrounding an upper display surface 42.

Figure 3:
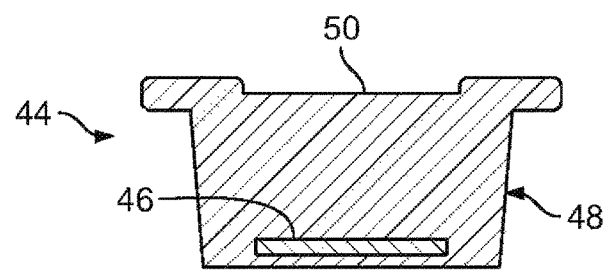
FIG. 3 is a cross-sectional side elevation view of another male-plug type reusable magnetic personal bottle closure according to the invention.

Turning to FIG. 3, another embodiment of a male-plug type reusable magnetic personal bottle closure is illustrated as a cap 44. Cap 44 is similar to cap 30, but with a differently shaped magnet 46 that is retained in a different manner. Magnet 46 is a broad, flat disc, over-molded or otherwise fully encased within the material of a hard cap body 48 of cap 44. Fully encasing magnet 46 in the material of hard cap body 48 obviates the need to consider the effects of a magnet cavity on the structural strength or stiffness of hard cap body 48 of a given exterior shape or how a magnet cavity may limit the space available for a display surface 50 on hard cap body 48. Thus, magnet 46 is illustrated as a broad disc having a thinner vertical dimension than magnet 34, which is believed to increase the holding force of magnet 46 retaining cap 44 on a storage surface.

Figure 4A:
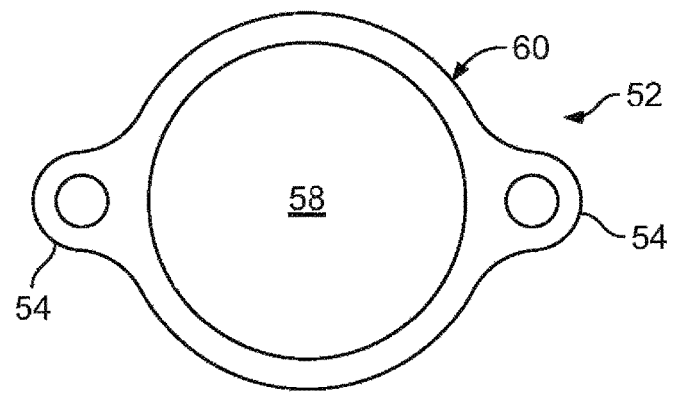
FIG. 4a is a top plan view of another male-plug type reusable magnetic personal bottle closure according to the invention.
Figure 4B:
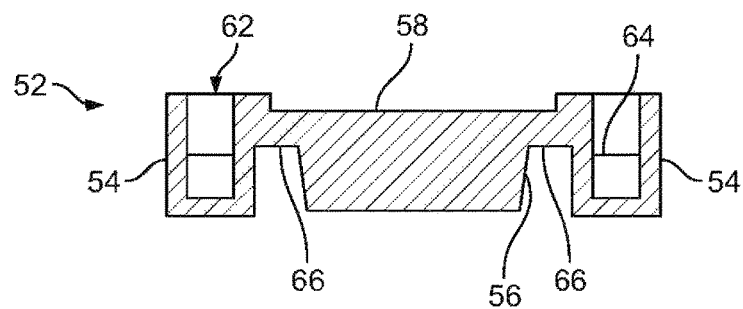

Referring to FIGS. 4a and 4b, another embodiment of a male-plug type reusable magnetic personal bottle closure is illustrated as a cap 52. In lieu of a full annular skirt, cap 52 includes a pair of magnet housing wings 54 on opposite sides of a plug 56 and display area 58 of a hard cap body 60. Wings 54 include magnet cavities 62 for retaining magnets 64, which may be of similar dimension to magnet cavities 18 and magnet 13 of magnet 10. The shape of cap 52 may beneficially save material costs compared to cap 10, while possibly complicating manufacture due to its more complex shape. In addition, the shape of cap 52 may be structurally weaker and/or less stiff than that of cap 10, particularly at regions 66 connecting wings 54 to plug 56 and display area 58.

Figure 5A:
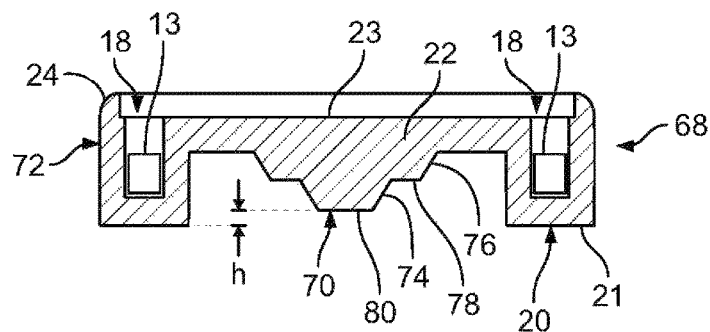
FIG. 5a is a cross-sectional side elevation view of another male-plug type reusable magnetic personal bottle closure according to the invention.
Figure 5B:
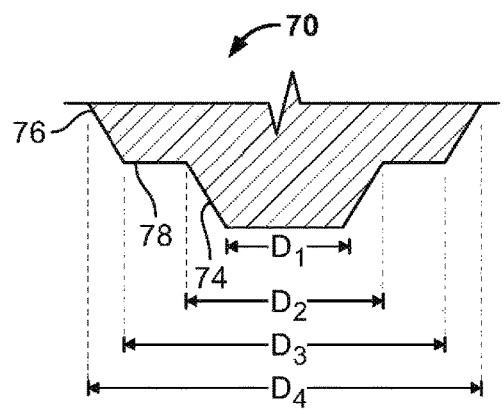

Turning to FIGS. 5a and 5b, another embodiment of a male-plug type reusable magnetic personal bottle closure is illustrated as a cap 68. Cap 68 is similar to cap 10, with like features labeled with like reference numerals, except in respect to a plug 70 of its hard cap body 72 which serves as its sealing portion. Plug 70 has a stepped-diameter profile, including a tapered sealing surface 74 for small diameter bottle openings and a tapered sealing surface 76 for large diameter bottle openings, joined by a generally horizontal, downward facing connecting surface 78. An enlarged cross-sectional view of plug 70 is depicted in FIG. 5b, illustrating the minimum and maximum diameters $D_1$ and $D_2$ of sealing surface 74 and the minimum and maximum diameters $D_3$ and $D_4$ of sealing surface 76. Thus, sealing surface 74 is generally adapted for sealing a bottle opening with an inner diameter greater than $D_1$ and less than $D_2$, while sealing surface 76 is generally adapted for sealing a bottle opening with an inner diameter greater than $D_3$ and less than $D_4$.

In addition, referring back to FIG. 5a, hard cap body 72 features a bottom surface 80 of a plug 70 being disposed at clearance h above bottom surface 21 of skirt 20. Clearance h permits cap 68 to be retained on a ferromagnetic storage surface without a bottom surface 80 or any other part of plug 70 contacting the storage surface, thus avoiding soiling of plug 70, as well as facilitating close contact of skirt 20 bottom surface 21 with the storage surface, in case the latter includes dimples or irregularities that might otherwise impinge on plug 70. Clearance h represents an optional feature of a cap body according to any embodiment of the invention whose sealing portion is of a male plug type and whose magnets are retained in a peripheral housing, such as a skirt or one or more wings.

Figure 6:
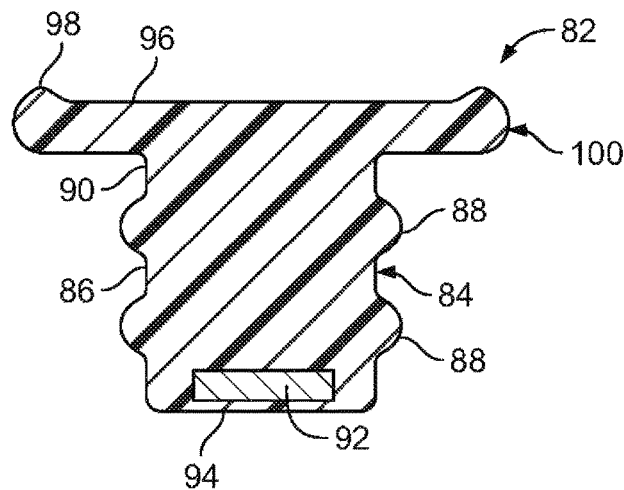
FIG. 6 is a cross-sectional side elevation view of another male-plug type reusable magnetic personal bottle closure according to the invention.

Turning to FIG. 6, another embodiment of a male-plug type reusable magnetic personal bottle closure is illustrated as a cap 82. Cap 82 is illustrated as including a soft or resilient cap body 84, which may, for example, be formed of silicone or other rubber, or of Santoprene® resin or other thermoplastic elastomer (TPE) resin. Being formed of a resilient material permits a plug 86 of cap body 84 to deform substantially when inserted into a bottle opening, thus allowing sealing to be achieved by one or more (two shown) annular sealing ribs 88 protruding radially outwardly from an otherwise generally cylindrical sidewall 90 of plug 86 so as to sealingly engage an inner sidewall of a bottle near its opening. Alternatively, a resilient material male plug may have a tapered sidewall similar to those of the hard cap body male plugs described above. The resilient material of cap body 84 may be over-molded around a magnet 92 disposed near a bottom surface 94 of cap body 84. Similarly to hard-bodied caps described above, cap 82 includes a recessed display surface 96 surrounded by a raised peripheral ridge 98 of an upper flange 100. Upper flange 100 should extend radially beyond an outer periphery of a bottle neck to facilitate removal of cap 82 by pushing up on a bottom surface of flange 100.

Female Plug and Internal Threaded Embodiments

With reference to FIGS. 7-10, several female plug and internal thread type embodiments of a bottle closure according to the invention will now be described. Each of these embodiments shares the aspect that sealing and retention functions are separated between two features, sealing being performed by a downward facing ring or disc of resilient material configured to be sealingly pressed against an upper edge of a bottle rim, and retention being performed by a resilient female plug yielding to grip the external threads of a bottle, or by the external threads of the bottle pressing downwardly against internal threads of the cap body (or of a screwcap embedded therein). This differs from the male plug embodiments, in each of which retention of the male plug is achieved by friction between it and an interior bottle surface at the same annular contact region where a seal is also formed.

Figure 7:
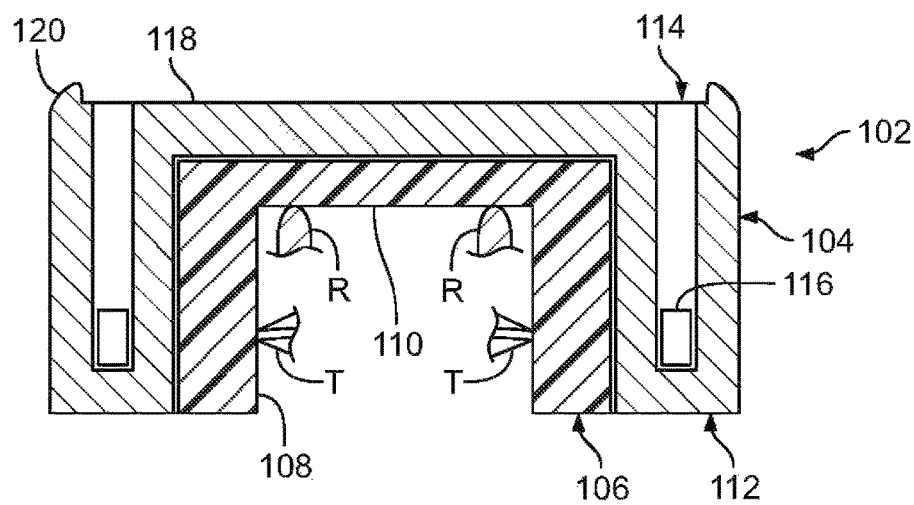
FIG. 7 is a cross-sectional side elevation view of a female-plug type reusable magnetic personal bottle closure according to the invention.

Turning to FIG. 7, an embodiment of a female-plug type reusable magnetic personal bottle closure is illustrated as a cap 102. Cap 102 features a hard cap body 104 retaining a cap liner 106 which combines an annular female plug 108 and a sealing seat 110 in a unitary body of resilient material. Female plug 108 is configured to yield to grip threads T (shown truncated) and sealing seat 110 is configured to yield to sealingly engage an upper edge of a bottle rim R (shown truncated). Cap liner 106 may be permanently or removably retained in hard cap body 104. Hard cap body 104 features a magnet retaining skirt 112 with magnet cavities 114 retaining magnets 116, and an upper display surface 118 within a raised peripheral ridge 120.

Figure 8:
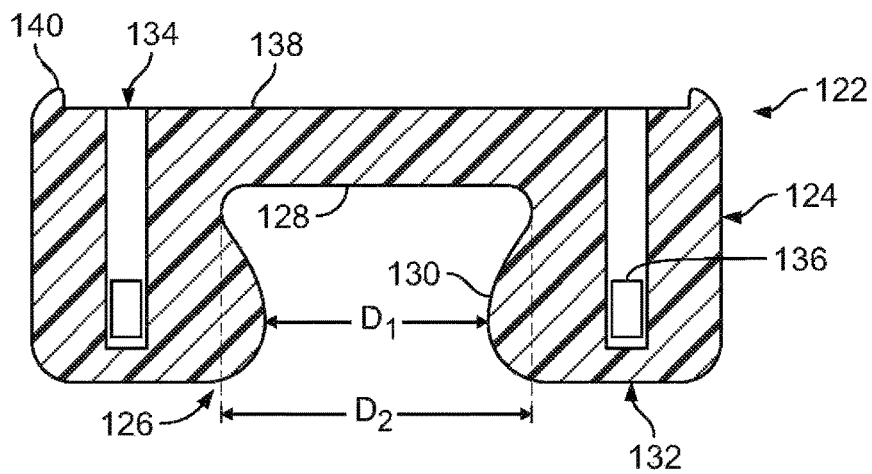
FIG. 8 is a cross-sectional side elevation view of another female-plug type reusable magnetic personal bottle closure according to the invention.

With reference to FIG. 8, another embodiment of a female-plug type reusable magnetic personal bottle closure is illustrated as a cap 122. Cap 122 features a resilient cap body 124 incorporating a female plug 126 and sealing seat 128. Female plug 126 includes a bulged sealing throat 130 having an inner diameter $D_1$ smaller than a maximum inner diameter of $D_2$ of a cavity defined by female plug 126, for gripping external threads of a bottle (not shown) having an outer diameter greater than $D_1$ and smaller than $D_2$, to retain a bottle rim upper edge (not shown) against sealing seat 128. A similarly bulged female plug shape may also be used as desired in conjunction with a two-piece cap similar to cap 102 described above. Resilient cap body 124 further features a magnet retaining skirt 132 with magnet cavities 134 retaining magnets 136, and an upper display surface 138 within a raised peripheral ridge 140.

Figure 9:
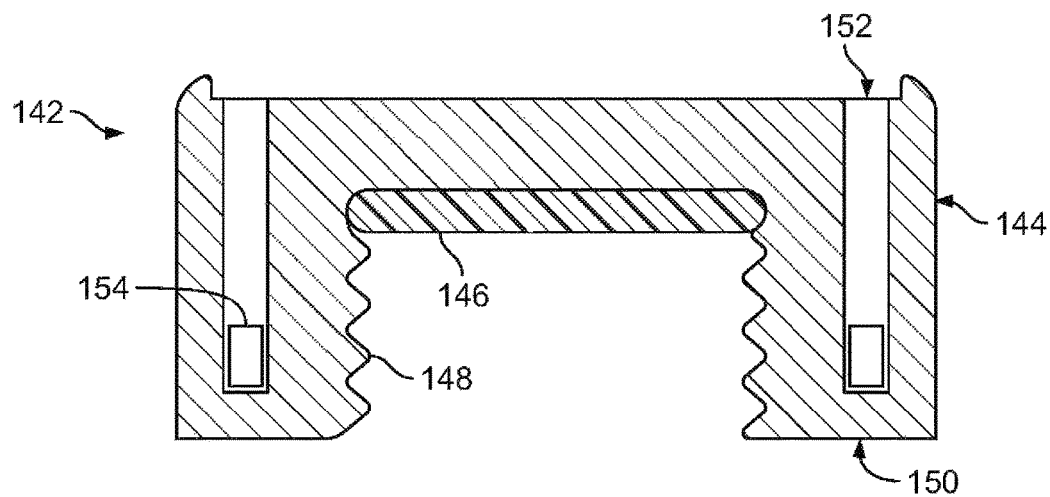
FIG. 9 is a cross-sectional side elevation view of an internally threaded reusable magnetic personal bottle closure according to the invention.

Referring to FIG. 9, another embodiment of a female-plug type reusable magnetic personal bottle closure is illustrated as a cap 142. Cap 142 features a hard cap body 144 retaining a resilient sealing seat 146. Internal threads 148 formed in hard cap body 144 serve to engage external bottle threads (not shown) to hold sealing seat 146 down in sealing engagement with an upper bottle rim (not shown). Hard cap body 144 further includes a magnet retaining skirt 150 with magnet cavities 152 retaining magnets 154, and an upper display surface 156 within a raised peripheral ridge 158.

Figure 10:
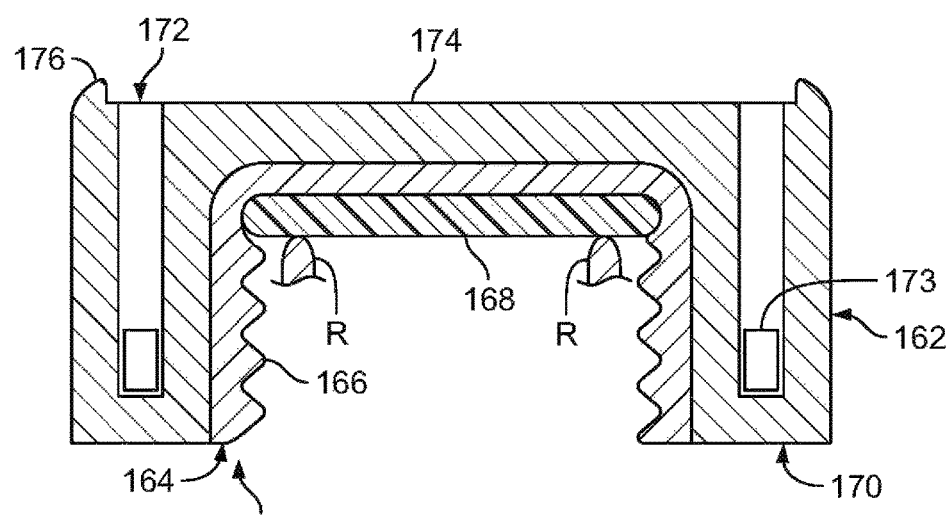
FIG. 10 is a cross-sectional side elevation view of another internally threaded reusable magnetic personal bottle closure according to the invention.

Turning to FIG. 10, another embodiment of a female-plug type reusable magnetic personal bottle closure is illustrated as a cap 160. Cap 160 features a hard cap body 162 retaining a screwcap 164, which may be a screwcap made for a particular type of disposable water bottle, or a substantial replica thereof. Screwcap 164 may be permanently bonded to hard cap body 162, or removably inserted therein, such as by a user inserting the original cap of a disposable water bottle that cap 160 is used to cover and seal. In the latter case, a suitable friction enhancing feature, such as circumferentially oriented barbs, a resilient coating, or the like (not shown), may be provided on an inner wall of hard cap body 162 to constrain screwcap 164 to rotate with cap body 162. Screwcap 164 includes internal threads 166 and a sealing seat 168, while hard cap body 162 features a magnet retaining skirt 170 with magnet cavities 172 retaining magnets 173, and an upper display surface 174 within a raised peripheral ridge 176.

It will be understood that internally threaded caps 142 and 160 shown in FIGS. 9 and 10, respectively, are generally configured to fit a specific bottle type with a specific external thread.

Storage System Embodiment

Figure 11:
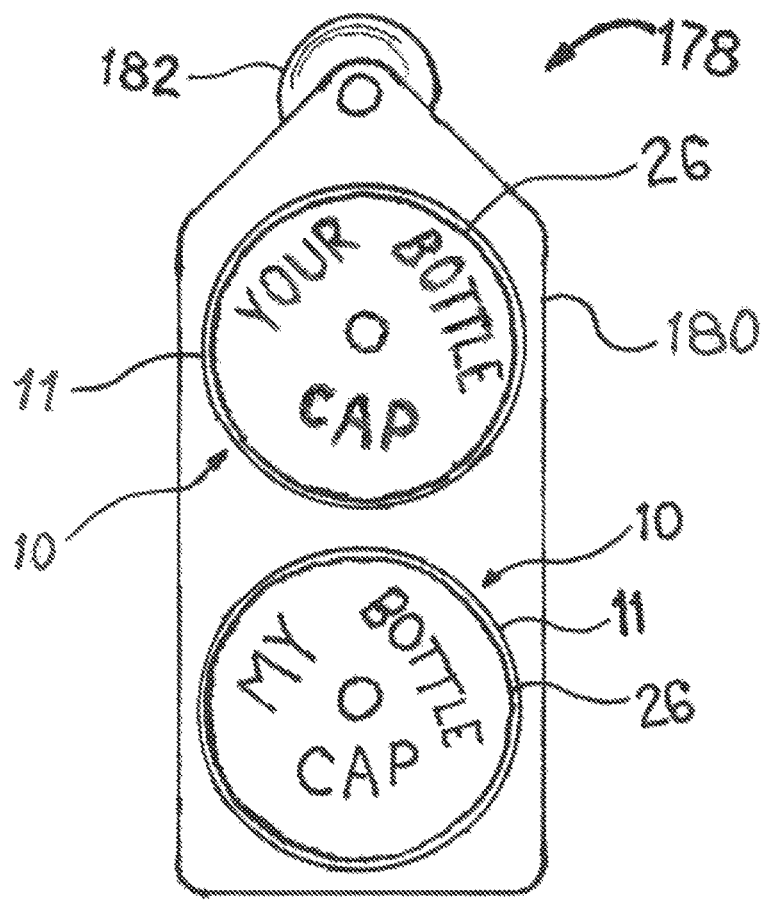
FIG. 11 is a plan view of a magnetic bottle closure storage system according to the invention.

Another embodiment of the invention is illustrated in FIG. 11 as a storage system 178 for storing reusable magnetic bottle closures, shown as caps 10. Storage system 178 includes a magnetically attracted storage surface, shown as a magnetically attracted plate 180, connected to a storage surface mount 182. Mount 182 is configured to mount plate 180 to a non-magnetically attracted storage system support. Mount 182 may be a suction cup, as shown, adapted for mounting plate 180 to a storage system support comprising a non-magnetically attracted surface. For example, the storage system support may comprise a surface of window glass or mirror glass, or of austenitic stainless steel or alloys, as are commonly used for the facings of stainless steel appliances (e.g., refrigerators). In this manner, storage system 178 permits reusable magnetic bottle closures to be stored on non-magnetic surfaces. In an embodiment, plate 180 itself may be a magnet, so that any reusable magnetically attracted bottle closure (or other magnetically attracted article) of a suitable size and weight may be stored thereon, regardless of whether the bottle closure or article comprises a magnet.

In variations of storage system 178, mount 182 may be of a different type, configured for a different type of storage system support. For example, mount 182 may instead comprise a pushpin, where the storage system support comprises a cork or bristle board; a hook or loop patch of a hook-and-loop fastener system, where the storage system support comprises the complementary hook or loop patch; a snap, button, or tag of material with a button hole, where the storage system support comprises an article of clothing or personal accessory with a complementary feature; a hanging hook, cord, or chain, where the storage system support comprises a corresponding hole, rod, or hook; a clip, where the storage system support comprises a an edge of a thin shelf, wall, or ledge; a patch of adhesive, where the storage system support is a flat surface compatible with the adhesive patch; or a hole in plate 180 itself, for receiving a rod, hook, or cord.

Materials and Manufacture

Cap bodies of magnetic bottle closures according to the invention are generally described and illustrated as being formed of a hard material, soft or resilient material, or both. Food-grade or food-compatible materials are preferred, particularly for portions of the cap body that may contact water or a beverage inside a reclosed bottle. Hard cap body materials may be hard plastics (e.g., high-density polyethylene/HDPE, polycarbonate, polyamide, polystyrene, polypropylene, or acrylonitrile butadiene styrene/ABS plastics), metals, glass, ceramics, wood or other plant materials, or composite materials. Soft cap body materials may, for example, be natural or synthetic rubbers, such as silicone, or resins, such as Santoprene® or other thermoplastic elastomer (TPE) resin.

Magnets according to the invention may be of any desired type. Rare-earth magnets, such as neodymium or samarium cobalt magnets, may be particularly desirable for providing a strong holding force with a relatively small and light magnet.

Cap bodies according to the invention may be manufactured according to any method suited to their material, shape, and other considerations. For example, hard plastic cap bodies may be injection molded. The cap bodies are typically one-piece unitary or integrally formed bodies. Being formed from a single piece of material may facilitate durability and ease of cleaning. On the other hand, in some embodiments, particularly some of those whose sealing portion comprises a downward-facing sealing seat held down against an upper bottle rim by a resilient female plug or internal threads, it may be desirable for the cap body to be formed as an assembly of two or more parts. The parts of an assembled cap body may be permanently joined, such as by adhesive bonding, heat sealing, over-molding, or a press fit, or the parts may alternatively be manually separable to facilitate cleaning.

Magnets are preferably retained permanently in cap bodies according to the invention, such as by a press fit, detent, and/or adhesive bond. In addition, when a reusable magnetic personal bottle closure of the invention is sealingly applied to a bottle, the magnet should be separated from an internal fluid volume of the bottle by a continuous wall of material comprised in a sealing portion of the cap body. Thus, if a magnet cavity is formed in the cap body for retaining a magnet, no part of the interior of the magnet cavity, should be in fluid communication with the bottle interior when the cap is applied, and the magnet is wholly prevented from falling into the fluid volume without the wall of material breaking. Still more preferably, the continuous wall of material has a seamless surface facing the internal fluid volume of the bottle, to inhibit soiling and bacterial growth, facilitate cleaning, and to inhibit separation, cracking, or breaking of the continuous wall. For example, the magnet cavity may be formed in a skirt or wing disposed radially outside an annular region of the cap body configured to make sealing contact with the bottle, or if radially within such a sealing contact region, it may be formed entirely on an upper side of the cap body. A magnet cavity may be formed during the molding of the cap body, or it may be drilled out of a molded cap body blank.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A drinking bottle closure comprising
a sealing portion operative to alternately fit disposable plastic beverage bottles having different bottle opening sizes, the sealing portion comprising a sealing surface and a non-magnetic retention feature, the sealing surface operative to sealingly engage a bottle opening of each of the disposable plastic beverage bottles, and the non-magnetic retention feature operative to impart an upward contact force to the respective disposable plastic beverage bottle to resist removal of the closure body in an upward direction from said sealing engagement of the sealing surface with the respective bottle opening;
an upper side configured to bear identifying indicia;
a lower end; and
a magnet retained vertically proximate to the lower end of the bottle closure and disposed to be isolated from fluid communication with the interior of the respective plastic beverage bottle when the sealing portion sealingly engages the respective bottle opening, the magnet operative to hold the lower end of the bottle closure against a magnetically attracted storage surface so that the upper side faces away from the storage surface.

2. The drinking bottle closure of claim 1, said lower end of the bottle closure being disposed below the sealing portion.

3. The drinking bottle closure of claim 1, the magnet being configured to be disposed radially outwardly of an opening of a drinking bottle when the drinking bottle closure sealingly engages the drinking bottle opening.

4. The drinking bottle closure of claim 1, the sealing portion comprising a tapered plug configured to be sealingly inserted into an opening of a drinking bottle.

5. The drinking bottle closure of claim 4, further comprising an annular flange configured to be disposed radially outwardly of an opening of a drinking bottle when the drinking bottle closure sealingly engages the drinking bottle opening, the annular flange comprising a cavity retaining the magnet.

6. The drinking bottle closure of claim 4, the tapered plug comprising a stepped profile.

7. The drinking bottle closure of claim 1, the retention feature comprising a ring of resilient material operative to yield to radially outward pressure from and grip exterior threads of a drinking bottle.

8. A drinking bottle closure comprising
a unitary closure body including a sealing portion operative to alternately fit disposable plastic beverage bottles having different bottle opening sizes, the sealing portion comprising a sealing surface and a non-magnetic retention feature, the sealing surface operative to sealingly engage a bottle opening of each of the disposable plastic beverage bottles, and the non-magnetic retention feature operative to impart an upward contact force to the respective disposable plastic beverage bottle to resist removal of the closure body in an upward direction from said sealing engagement of the sealing surface with the respective bottle opening, and an upper side configured to bear identifying indicia; and
a magnet retained within the unitary closure body and disposed to be separated from an interior volume of a water bottle at least by a continuous, water-impermeable surface of the sealing portion.

9. A reusable drinking bottle closure storage system comprising
a drinking bottle closure comprising a lower end, an upper side configured to bear identifying indicia, and a magnet retained in the bottle closure;
a magnetically attracted storage surface operative to retain the lower end of the drinking bottle closure against the storage surface so that the upper side faces away from the storage surface; and
a storage surface mount connected to the magnetically attracted storage surface, the storage surface mount configured to mount the storage surface and retained closure to a non-magnetically attracted storage system support.

10. The system of claim 9, wherein the storage surface comprises a magnet.

11. The system of claim 9, wherein the storage surface mount comprises a suction cup.

* * * * *